3 Sheets—Sheet 1.
A. RIDGWAY.
ANIMAL SHEARS.
No. 248,952. Patented Nov. 1, 1881.
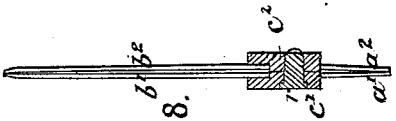
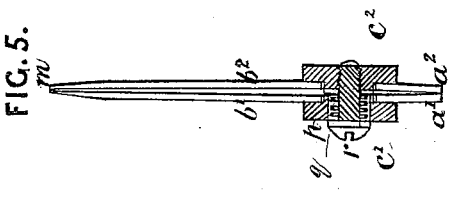
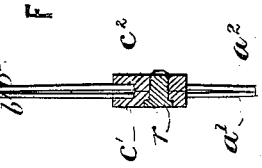
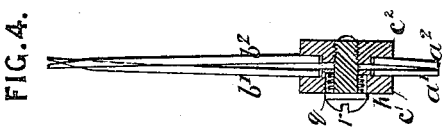
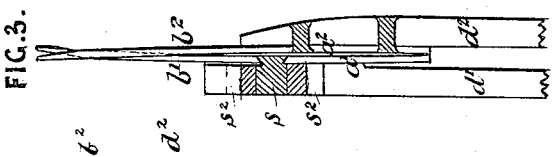
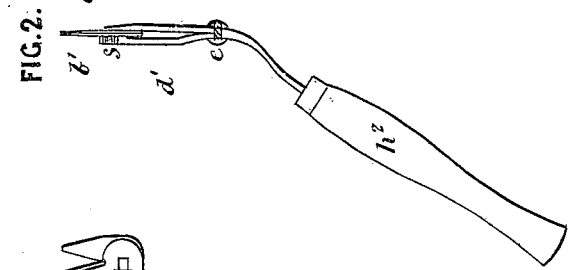
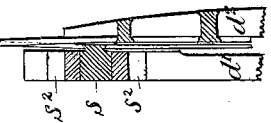
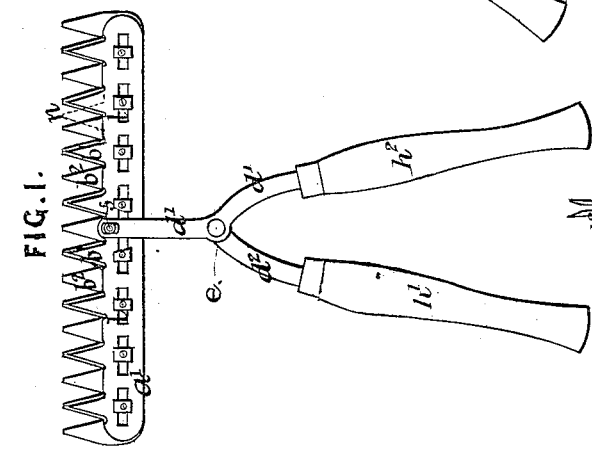
Witnesses
Jas. E. Hutchinson
Penn. Halsted
Inventor
Alfred Ridgway
by John J. Halsted
atty

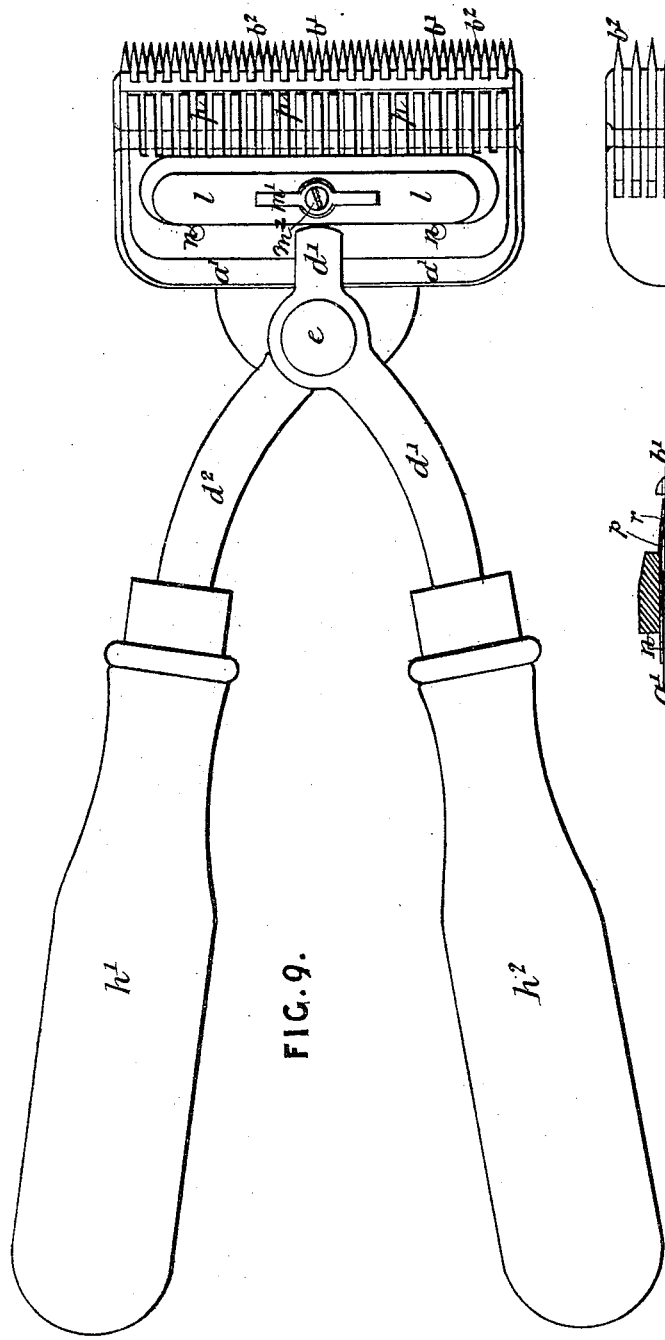
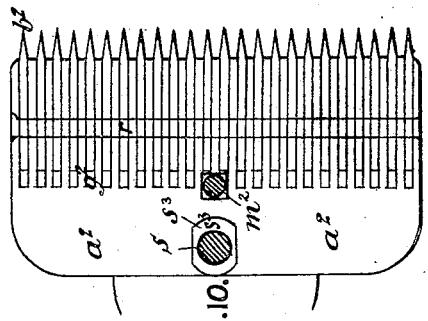
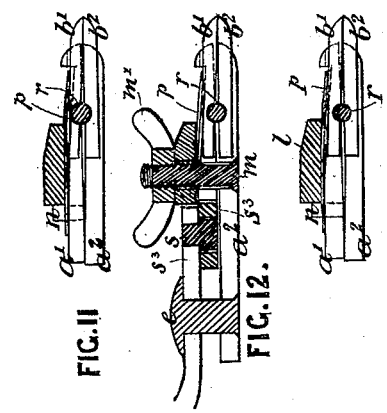
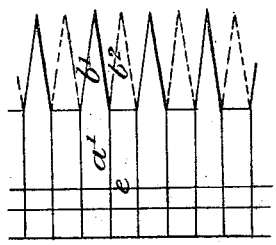

3 Sheets—Sheet 3.
A. RIDGWAY.
ANIMAL SHEARS.
No. 248,952. Patented Nov. 1, 1881.
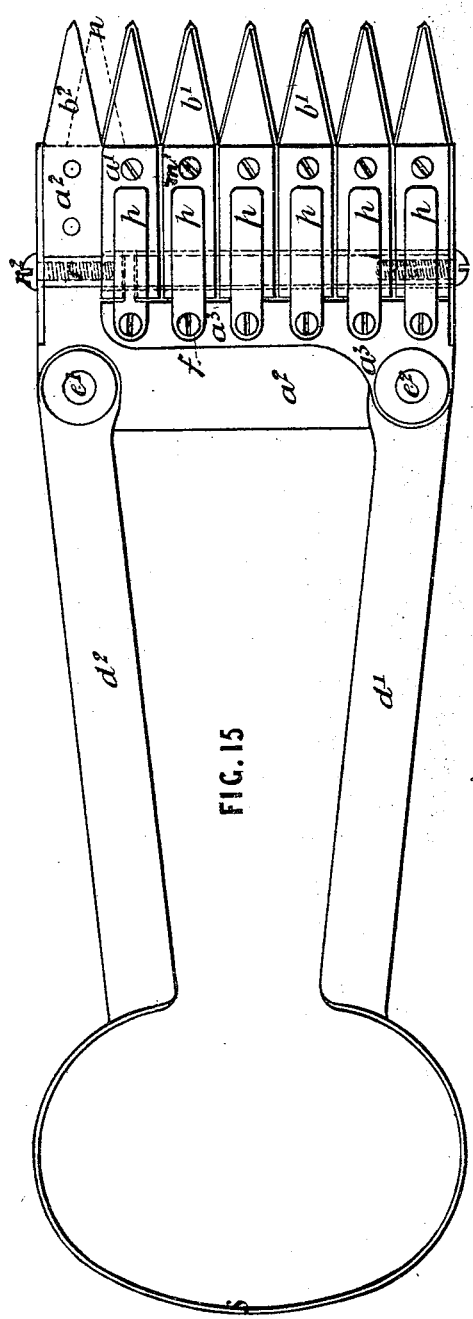
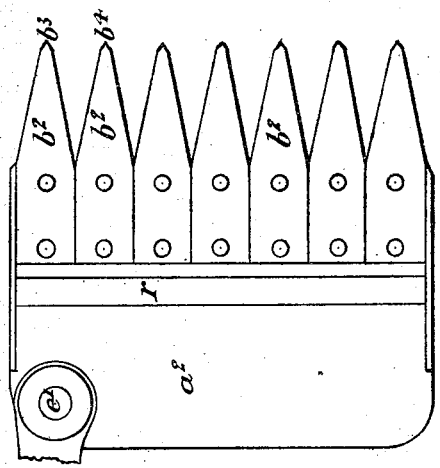
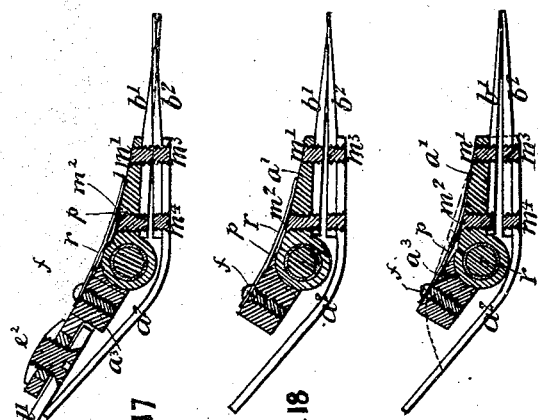
Witnesses:
Jas. E. Hutchinson
Penn Halsted
Inventor.
Alfred Ridgway
by John J. Halsted

UNITED STATES PATENT OFFICE.

ALFRED RIDGWAY, OF MACCLESFIELD, COUNTY OF CHESTER, ENGLAND.

ANIMAL-SHEARS.

SPECIFICATION forming part of Letters Patent No. 248,952, dated November 1, 1881.

Application filed January 15, 1880.

*To all whom it may concern:*

Be it known that I, ALFRED RIDGWAY, of Macclesfield, in the county of Chester, England, have invented certain improvements in the construction of instruments or machines for cutting, shearing, or clipping hedges, corn or corn-stacks, grass, lawns, or turf, sheep, horses, or other animals, or human hair, of which the following is a specification.

This invention relates to cutting, shearing, or clipping instruments or machines in which a series of cutting-teeth are provided and caused to reciprocate or oscillate over each other, the action of which, when applied to hedges, corn or corn-stacks, grass, lawns, or turf, sheep, horses, or other animals, or human hair, cuts or clips therefrom according to the nature of the produce, twigs, straw, grass, wool, or hair gathered in the teeth.

The object of the invention is to facilitate and obtain a better, cleaner, and more certain cut or means of cutting on a series of blades or teeth for the purpose of cutting, shearing, or clipping hedges, corn or corn-stacks, grass, lawns, or turf, sheep, horses, or other animals, or human hair.

The invention relates to the cutting-teeth; and it consists in obtaining a true shear or scissor like cut on a series of blades by causing the edges of the blades to cross each other at a slight angle, similar to those of shears or scissors, and consequently bring the edges of the top blades in absolute contact with the edges of the bottom blades when passing over each other, thereby obtaining a better, cleaner, and more certain cut than heretofore on a series of blades.

In carrying my invention into effect I use various mechanisms as appears most applicable to the different purposes before mentioned; but any of the different mechanisms herein described, or a combination of the different mechanisms, may be made more or less applicable to any of the different purposes, for all of which different purposes the object is to cause the edges of the top and bottom blades or teeth to pass over each other at a slight angle, or cause the edges of the top and bottom blades to cross each other in passing over each other, and consequently bring the edges of the top and bottom blades in close and certain contact with each other, similar to the blades of scissors or other single-cutting shears now in common use, thereby obtaining a better, cleaner, and more certain cut on a series of blades.

In order that my invention may be fully understood and readily carried into effect, I have shown in drawings hereunto annexed instruments or machines constructed according to my invention.

The drawings are full size, excepting Figures 1 and 2, which are drawn to the scale of one-fifth full size.

Fig. 1 is a plan of a machine suitable for cutting hedges, corn or corn-stacks, grass, lawns, or turf, of which Fig. 2 is a sectional elevation.

Fig. 3 is a section (full size) through the levers $d'$ and $d^2$ and slide-stud $s$, and shows the top and bottom blades in the position shown in Fig. 1, and shows a gradual contact of the cutting surface or edges, beginning from near the heel of the sharp blades or teeth or shear $b'$ and $b^2$, and also the manner in which the blades cross each other.

Fig. 4 is a section showing the blades $b'$ and $b^2$ when the blades $b'$ have passed over the blades $b^2$ to the dotted position $n$, Fig. 1, and again showing the manner in which the blades cross each other at this point.

Fig. 5 is a section through Fig. 1, showing the blades $b'$ and $b^2$ when the blades $b'$ have passed over the blades $b^2$ and completed the cut. The mechanism is arranged as follows: A plate, $a'$, with a series of coarse cutting-teeth, $b'$, are caused to reciprocate or oscillate over the teeth $b^2$ of an under plate, $a^2$, with teeth to correspond with the teeth of the upper plate. The under plate, $d^2$, is fixed to a handle, $d^2 h'$, Figs. 1 and 3, by which the machine is held and guided to its work. By another or corresponding handle, $d' h^2$, Figs. 1 and 3, a rectilinear reciprocating or oscillating motion is given to the top plate, $a'$, through the medium of a lever-handle, $d' e h^2$, the fulcrum $e$ of which is formed by a stud, $e$, which passes through both handles or levers and connects them together. The lever-handle $d' e h^2$ is connected to the top plate, $a'$, only by means of a compound stud, $s$, Figs. 1 and 3, the center part of which is secured to the top plate, $a'$, and passes through the center of the sliding part, which in the motion of the machine works to and fro in a slot, $s^2$, Fig. 3, to receive it in the top part of the lever-handle $d'$ $e$ $h^2$, as shown at Figs. 1, 2, and 3. The plates $a'$ and $a^2$ and the blades or teeth $b'$ and $b^2$ are bent from the point $a'$ $a^2$ to the point $m$, Fig. 5, as shown, thereby causing the edges of the top and bottom blades to come in contact in passing over or climbing up each other. The two plates $a'$ and $a^2$ are held together by means of studs $c'$ and $c^2$. The studs $c'$ and $c^2$ and the blades $b'$ and $b^2$ are held together by screws $r$, Figs. 1, 4, 5, 7, and 8. The plates and blades, as shown, Figs. 3, 4, and 5, are made of metal, so thick that they will not give, bend, or spring as the edges come in contact or climb up each other; therefore the studs which hold them together are provided with a spring, $p$, in the cavity $q$, which allows the studs and blades to give way sufficiently to allow the top blades to pass over or climb up the bottom blades and hold the top and bottom blades sufficiently together to bring the edges in contact in passing over each other. The studs $c'$ and $c^2$ rest in slots $l$, Fig. 1, in the top and bottom plates, $a'$ and $a^2$, and project over the said top and bottom plates, as shown, Figs. 4 and 5, thereby holding the two plates together and allowing the top plate sufficient oscillation over the bottom plate. The plates and blades, as shown, Figs. 6, 7, and 8, are made of metal sufficiently thin to give way or bend in passing over each other, as shown, Figs. 6, 7, and 8; therefore the studs $c'$ and $c^2$ are made rigid.

Fig. 9 is a plan of a machine for cutting or clipping horses, sheep, or other animals, of which Figs. 11, 12, and 13 are sectional elevations. The mechanism is arranged as follows: A plate, $a'$, with a series of cutting-teeth, $b'$ and $b^2$, Figs. 9, 10, 11, 12, and 13, of suitable size, as applied to the different purposes, which are let into grooves $g'$ and $g^2$ in the top and bottom plates, provided to receive the same, are caused to reciprocate or oscillate over the teeth $b^2$ of an under plate, $a^2$, Figs. 9, 10, 11, 12, and 13, the teeth of which are let into the said plate $a^2$ in grooves provided to receive the same. The under plate, $a^2$, is fixed to a handle, $d^2$ $h'$, by which the instrument or machine is held or guided to its work by another or corresponding handle, $d'$ $h^2$. A rectilinear reciprocating or oscillating motion is given to the top plate, $a'$, through the medium of a lever-handle, $d'$ $h^2$, the fulcrum $e$ of which is formed by a stud, $e$, which passes through both handles or levers and connects them together. The lever-handle $d'$ $h^2$ is connected to the top plate, $a'$, only by means of a compound stud, $s$, Figs. 10 and 12, the center part of which is secured to the top lever-handle, $d'$ $h^2$, and passes through the center of the sliding part $s^3$, Fig. 12, which, in the motion of the machine, works to and fro in a slot made to receive it in the top plate, $a'$, as shown at $s$, Fig. 12. The teeth in the plates $a'$ and $a^2$ are held in the grooves in the plates $a'$ and $a^2$ by a rod, $r$, Figs. 10, 11, 12, and 13, which is received in a groove made in the said teeth and sides of the grooves in the plates $a'$ and $a^2$ to receive the same. The said rod $r$, Figs. 10, 11, 12, and 13, also serves to keep the heels of the teeth $b'$ and $b^2$ slightly apart, and thereby causes the teeth of the top plate to pass over the teeth of the bottom plate at a slight angle, and thereby produce the desired shear or scissor like cut. The said rod $r$ also serves to prevent the top plate, $a'$, from pressing on the teeth as the top plate, $a'$, is carried or slides on the said rod $r$, and the heel of the bottom plate, $a^2$, thereby allowing the teeth $b'$ a little play to work up and down in the grooves in the top plate when passing over the teeth in the bottom plate, $a^2$. The required amount of pressure is given to the teeth in the top plate to cause them to cut when passing over the teeth in the bottom plate by the spring $p$, Figs. 9, 11, 12, and 13, the amount of pressure being adjusted by the screw $m'$ and the bolt $m^2$, which passes through the plates $a'$ and $a^2$, the spring $p$, the equalizing-plate $l$, Figs. 9, 11, 12, and 13, and holds them together. The spring $p$ is slit, so as to allow each tooth in the top plate to work independently of the other. The spring $p$ is also secured in position by the two pins $n$, which also serves to keep the equalizing-plate $l$, Figs. 9, 11, and 13, in position, as shown on Fig. 9. The top plate, $a'$, and the spring $p$ are slotted, to allow the said top plate, $a'$, and spring $p$ a sufficient rectilinear reciprocating and oscillating motion about the bolt $m^2$.

Fig. 15 is another plan of a machine for cutting or clipping sheep or other animals or human hair, of which Figs. 17, 18, and 19 are sectional elevations. The mechanism is arranged as follows: a rod, $r$, Figs. 15, 16, 17, 18, 19, and 20, with a series of teeth, which are separately connected or hinged by the hinges $a'$, which are secured to the top blades by the screws $m'$ and $m^2$, the said rod being secured to the sides of the bottom plate, $a^2$, by the screws $r^2$, Fig. 15, the sides of the bottom plate, $a^2$, Fig. 20, being turned up to receive the said rod $r$, Fig. 20. The rod thereby carries the heels of the blades $b'$, Figs. 17, 18, and 19, slightly apart from the heels of the bottom blades, $b^2$, thereby causing the edges of the top and bottom blades to pass over each other at a slight angle and cause the edges of the said top and bottom blades to come in contact in passing over each other.

Fig. 17 is a sectional elevation, showing the angle or shear of the blades when in the position shown in plan, Fig. 15.

Fig. 18 is a sectional elevation, showing the angle or shear when the top blades have been brought into the position shown by the dotted lines $n$, Fig. 15, and shows the manner in which the top blades gradually climb up the bottom blades or teeth.

Fig. 19 is a sectional elevation, showing the angle when the top blades have passed over the bottom blades and completed the cut. The top blades, $b'$, in passing over or climbing up the bottom blades $b^2$, work on the hinge $a'$, and the requisite amount of pressure to keep the edges of the said top blades in contact with edges of the bottom blades and cause them to cut in passing over the bottom blades is given by the springs $p$, which are secured to the back part of the hinge $a^3$, Figs. 15, 17, 18, and 19. The said back part of the hinge $a^3$ is also hinged upon the rod $r$. The bottom plate, $a^2$, is slightly twisted, so that when the blades $b^2$, Figs. 16, 17, 18, and 19, are secured to the said bottom plate, $a^2$, by the screws $m^3$ and $m^4$, the point $b^3$ of the blade $b^2$ is sufficiently higher than the point $b^4$ of the adjoining blade $b^2$ to allow the point of the blade $b'$ to fall sufficiently to obtain a shear or to cross the edges while passing over each other.

Motion is given to the machine as follows: The under plate, $a^2$, is connected to the side of the handle $d^2$ by the stud $e'$, which forms a hinge-joint. The other or corresponding side of the handle $d'$ is connected to the back part of the hinge $a^3$ by the stud $e^2$, which also forms a hinge-joint. By this means a rectilinear reciprocating or oscillating motion is given by pressing the handle or handles together. When the cut is completed the blades $b'$ are brought back again ready for another cut by the spring or bow part of the handle $s$, Fig. 15.

I have asserted that any of the different mechanisms herein described, or a combination of the different mechanisms, may be made more or less applicable to any of the different purposes. Now, in order to show that the way in which the large or small blades or teeth may be made applicable to any of the different purposes herein described, I show in Fig. 14 a means by which a series of blades or teeth may be made from one or in one plate similar to the grass-cutter blades, and may be applied in a similar form, as applicable to horse-clipping.

In order to give the requisite amount of shear to small blades or teeth when made from or in one plate, or when forming a part of the same plate or blade, as shown, Fig. 14, the plate $a'$ is slit down to the point $e$, Fig. 14, and bent similarly to the grass-cutter blades, Figs. 6, 7, and 8, and made of metal of suitable thickness to spring or give way sufficiently in passing over the under blades or teeth.

For sheep-shearing I prefer blades or teeth about the size shown, $b'$, Fig. 14, when the mechanism is similar to the mechanism shown in Figs. 9, 10, 11, 12, and 13.

It will be seen that when the blades $b'$, Figs. 1 and 9, are double-acting, as herein described and set forth, or when the cutting is performed by both edges of the blades $b'$ and $b^2$, or when the top plate, $a'$, is moved to or fro, the blades $b'$ fall between the blades $b^2$; consequently the space between the blades or teeth $b'$ and $b^2$ must be at least equal to the width of the said blades or teeth, in order to allow the said blades $b'$ to fall down between and climb up the blades $b^2$.

Having now described the nature of my said invention and the manner of carrying the same into effect, I would have it distinctly understood that I do not intend to limit my claim solely to the exact arrangement of mechanism herein described, as the same may be greatly varied without departing from the true character of my invention.

What I claim, and wish to protect by these my in part recited Letters Patent, is—

1. In a clipping device, the combination, with a plate having a series of cutting-blades, of a plate sliding thereon and provided with a series of blades each of which is independently movable, and is independently provided with a spring-pressure to force it forward and produce a shear or scissor like cut, substantially as shown and described.

2. In combination with a clipper having two series of cutting-blades, an interposed rod or bar on which the independently-movable blades may rock or move in a direction transverse of their sliding or reciprocating movement, thus producing a shear or scissor like cut on a series of blades, substantially as shown and described.

In testimony whereof I have hereto set my hand and affixed my seal this 13th day of November, 1879.

ALFRED RIDGWAY. [L. S.]

Witnesses:
G. F. REDFERN,
A. ALBUTT.